US008239766B2

United States Patent
Tian et al.

(10) Patent No.: US 8,239,766 B2
(45) Date of Patent: Aug. 7, 2012

(54) MULTIMEDIA CODING TECHNIQUES FOR TRANSITIONAL EFFECTS

(75) Inventors: Tao Tian, San Diego, CA (US); Fang Shi, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 790 days.

(21) Appl. No.: 11/501,969

(22) Filed: Aug. 9, 2006

(65) Prior Publication Data

US 2007/0074117 A1 Mar. 29, 2007

Related U.S. Application Data

(60) Provisional application No. 60/721,417, filed on Sep. 27, 2005.

(51) Int. Cl.
 *G06F 3/00* (2006.01)
(52) U.S. Cl. ......... 715/726; 715/723; 382/232; 382/238
(58) Field of Classification Search .................. 715/716, 715/719–726; 345/619, 639–641
 See application file for complete search history.

(56) References Cited

U.S. PATENT DOCUMENTS

| | | | | |
|---|---|---|---|---|
| 5,218,672 A | * | 6/1993 | Morgan et al. | 345/501 |
| 5,654,761 A | * | 8/1997 | Jung | 375/240.16 |
| 5,699,120 A | * | 12/1997 | Case et al. | 375/240.02 |
| 5,786,864 A | | 7/1998 | Yamamoto | |
| 6,084,641 A | * | 7/2000 | Wu | 348/722 |
| 6,177,953 B1 | * | 1/2001 | Vachette et al. | 348/59 |
| 6,310,919 B1 | * | 10/2001 | Florencio | 375/240.16 |
| 6,323,914 B1 | * | 11/2001 | Linzer | 348/578 |
| 6,473,132 B1 | * | 10/2002 | Foss | 348/584 |
| 6,473,459 B1 | | 10/2002 | Sugano et al. | |
| 7,277,486 B2 | * | 10/2007 | Srinivasan et al. | 375/240.12 |
| 7,376,186 B2 | * | 5/2008 | Boyce et al. | 375/240.15 |
| 2002/0009149 A1 | * | 1/2002 | Rodriguez et al. | 375/240.25 |
| 2002/0122601 A1 | * | 9/2002 | Peng | 382/250 |
| 2002/0126224 A1 | * | 9/2002 | Lienhart | 348/700 |

(Continued)

FOREIGN PATENT DOCUMENTS

EP 1301042 A2 4/2003

(Continued)

OTHER PUBLICATIONS

S.B. Jun, K. Yoon and H.Y. Lee, Dissolve transition detection algorithm using spatio-temporal distribution of MPEG macro-block types, Proceedings of ACM International Conference on Multimedia (2000), pp. 391-394.*

(Continued)

*Primary Examiner* — Weilun Lo
*Assistant Examiner* — Enrique Iturralde
(74) *Attorney, Agent, or Firm* — Stanton C. Braden

(57) ABSTRACT

This disclosure is directed to techniques for encoding and decoding transitional effects, i.e., visual video effects that are used to transition from a current scene of a multimedia sequence. According to the disclosed techniques, an encoding device detects a transitional effect associated with a multimedia sequence during the encoding of the multimedia sequence, and transmits information as part of an encoded multimedia sequence to identify the transitional effect associated with the encoded multimedia sequence to a decoder. The information may comprise metadata that can be used by the decoder to simulate or re-create the transitional effect. The decoder simulates a transitional effect in response to the information.

41 Claims, 10 Drawing Sheets

U.S. PATENT DOCUMENTS

| | | | |
|---|---|---|---|
| 2003/0007566 A1* | 1/2003 | Peng et al. | 375/240.25 |
| 2003/0179237 A1* | 9/2003 | Nelson et al. | 345/765 |
| 2003/0206593 A1* | 11/2003 | Srinivasan et al. | 375/240.16 |
| 2004/0008782 A1* | 1/2004 | Boyce et al. | 375/240.16 |
| 2004/0017949 A1* | 1/2004 | Lin et al. | 382/232 |
| 2004/0246373 A1* | 12/2004 | Kadono et al. | 348/384.1 |
| 2005/0135687 A1* | 6/2005 | Boice et al. | 382/239 |
| 2005/0281334 A1* | 12/2005 | Walker et al. | 375/240.16 |
| 2006/0104365 A1* | 5/2006 | Li et al. | 375/240.27 |
| 2006/0281334 A1* | 12/2006 | Shin et al. | 438/780 |
| 2007/0071093 A1 | 3/2007 | Shi et al. | |
| 2008/0037657 A1* | 2/2008 | Srinivasan et al. | 375/240.26 |

FOREIGN PATENT DOCUMENTS

| | | |
|---|---|---|
| KR | 1020030094655 | 12/2003 |
| KR | 2005-22777 | 3/2005 |
| TW | 506195 | 10/2002 |
| TW | 200507465 | 2/2005 |
| TW | I239180 | 9/2005 |
| WO | 2004057609 A1 | 7/2004 |

OTHER PUBLICATIONS

International Search Report—PCT/US06/037947—International Search Authority—European Patent Office—Apr. 23, 2007.

Written Opinion—PCT/US06/037947—International Search Authority—European Patent Office—Apr. 23, 2007.

Taiwanese Search Report-095135797, TIPO—Dec. 14, 2009.

Abe N., "Adobe Premiere Pro Super reference for Windows," Sotechsha Co. ltd,Mar. 20, 2004, first edition, pp. 170-179.

* cited by examiner

MULTIMEDIA CODING TECHNIQUES FOR TRANSITIONAL EFFECTS

CLAIM OF PRIORITY UNDER 35 U.S.C. §119

The present Application for Patent claims priority to Provisional Application No. 60/721,417, filed Sep. 27, 2005, and assigned to the assignee hereof and hereby expressly incorporated by reference herein.

TECHNICAL FIELD

The disclosure relates to digital multimedia encoding and decoding and, more particularly, techniques for encoding and decoding transitional effects associated with multimedia sequences.

BACKGROUND

A number of different video encoding standards have been established for coding digital multimedia sequences. The Moving Picture Experts Group (MPEG), for example, has developed a number of standards including MPEG-1, MPEG-2 and MPEG-4. Other examples include the International Telecommunication Union (ITU) H.263 standard, and the emerging ITU H.264 standard, which is also set forth in MPEG-4 Part 10, entitled "Advanced Audio Coding." These video coding standards generally support improved transmission efficiency of multimedia sequences by coding data in a compressed manner. Compression reduces the overall amount of data that needs to be transmitted for effective transmission of multimedia frames. Video coding is used in many contexts, including video streaming, video camcorder, video telephony (VT) and video broadcast applications, over both wired and wireless transmission media.

The MPEG-4, ITU H.263 and ITU H.264 standards, in particular, support video coding techniques that utilize similarities between successive multimedia frames, referred to as temporal or inter-frame correlation, to provide Inter-frame compression. The inter-frame compression techniques exploit data redundancy across frames by converting pixel-based representations of multimedia frames to motion representations. Frames coded using inter-frame techniques are often referred to as P ("predictive") frames or B ("bi-directional") frames. Some frames, commonly referred to as I ("intra") frames, are coded using spatial compression, which is non-predictive. In addition, some frames may include a combination of both intra- and inter-coded blocks.

Transitional effects can present challenges in video coding, particularly when inter-frame compression is used. Transitional effects refer to visual video effects that are used to transition from a current scene of a multimedia sequence. Transitional effects include fading effects, dissolving effects, sliding effects, breaking effects, flipping effects, and a wide range of other types of visual effects used to transition away from a current scene. Often, the transitional effects are used to change from a first scene to a second scene, such as by fading or dissolving the first scene into the second scene. However, the transitional effects may also be used in other contexts, such as by fading or dissolving the last scene of a sequence to an empty scene in order to signify the end of that multimedia sequence.

SUMMARY

This disclosure is directed to techniques for encoding and decoding transitional effects. The techniques may improve data compression in a coded multimedia sequence and/or improve the visual quality of the transitional effect. According to the disclosed techniques, an encoding device detects a transitional effect associated with a multimedia sequence during the encoding of the multimedia sequence, and transmits information as part of an encoded multimedia sequence to identify the transitional effect to a decoder.

The decoder receives the information identifying the transitional effect associated with the multimedia sequence. The information identifying the transitional effect may comprise metadata that can be used by the decoder to simulate or re-create a transitional effect. The encoded multimedia sequence is then decoded in response to the information to simulate the transitional effect. A number of examples of the specific information that can be sent to facilitate the simulation of different transitional effects are also described. In some cases, the information identifying the transitional effect may simply trigger simulation of some type of transitional effect, which is not necessarily the same as that in the original video sequence. In other cases, the information identifying the transitional effect may identify a specific type of effect to the decoder.

In some embodiments, the techniques of this disclosure may implement interpolation techniques similar to those often referred to as frame rate up-conversion (FRUC) in order to allow for encoder-assisted transitional effect simulation at the decoder. In this case, for transitional effects, FRUC-like techniques may be used instead of conventional predictive- or spatial-based coding for the frames of a transitional effect in order to improve data compression in a coded multimedia sequence and/or improve the visual quality of the transitional effect.

In some embodiments, this disclosure provides a method comprising receiving information as part of an encoded multimedia sequence, wherein the information identifies a transitional effect associated with the multimedia sequence, and decoding the encoded multimedia sequence including simulating the transitional effect in response to the information.

In some embodiments, this disclosure provides a method comprising detecting a transitional effect associated with a multimedia sequence during encoding of the multimedia sequence, and generating information as part of an encoded multimedia sequence to identify the transitional effect.

In some embodiments, this disclosure provides an apparatus comprising a receiver configured to receive information as part of an encoded multimedia sequence, wherein the information identifies a transitional effect associated with the multimedia sequence, and a decoder that simulates the transitional effect in response to the information.

In some embodiments, this disclosure provides an apparatus comprising a detector that detects a transitional effect associated with a multimedia sequence during the encoding of the multimedia sequence, and an encoder that generates information to identify the transitional effect as part of an encoded video sequence.

In some embodiments, this disclosure provides a processor configured to receive information as part of an encoded multimedia sequence, wherein the information identifies a transitional effect associated with the multimedia sequence, and decode the encoded multimedia sequence including simulating the transitional effect in response to the information.

In some embodiments, this disclosure provides a processor configured to detect a transitional effect associated with a multimedia sequence during the encoding of the multimedia sequence, and generate information as part of an encoded multimedia sequence to identify the transitional effect associated with the encoded multimedia sequence to a decoder.

In some embodiments, this disclosure provides an apparatus comprising means for receiving information as part of an encoded multimedia sequence, wherein the information identifies a transitional effect associated with the multimedia sequence, and means for decoding that simulates a transitional effect in multimedia sequence in response to the information identifying the transitional effect.

In some embodiments, this disclosure provides an apparatus comprising means for detecting transitional effects that detects a transitional effect associated with a multimedia sequence during the encoding of the multimedia sequence, and means for encoding that generates information to identify the transitional effect associated with the multimedia sequence.

The techniques described herein may be implemented in hardware, software, firmware, or any combination thereof. If implemented in software, the software may be executed in a digital signal processor (DSP) or other type of processor. The software that executes the techniques may be initially stored in a machine-readable medium, such as a computer-readable medium, and loaded and executed in the processor or other machine to allow for video encoding or decoding of transitional effects as described herein.

Accordingly, this disclosure also contemplates a machine-readable medium comprising instructions that upon execution cause a machine to receive information as part of an encoded multimedia sequence, wherein the information identifies a transitional effect associated with the multimedia sequence, and decode the encoded multimedia sequence including simulating the transitional effect in response to the information.

Also, this disclosure contemplates a machine-readable medium comprising instructions that upon execution cause a machine to detect a transitional effect associated with a multimedia sequence during encoding of the multimedia sequence, and generate information as part of an encoded multimedia sequence to identify the transitional effect.

The details of one or more embodiments are set forth in the accompanying drawings and the description below. Other features, objects, and advantages will be apparent from the description and drawings, and from the claims.

DETAILED DESCRIPTION

This disclosure is directed to techniques for encoding and decoding transitional effects. Transitional effects refer to visual video effects that are used to transition from a current scene of a multimedia sequence. Examples of transitional effects include fading effects, wiping effects, dissolving effects, sliding effects, breaking effects and flipping effects, to name a few. Often, the transitional effects are used to change from a first scene to a second scene, such as by fading or dissolving the first scene into the second scene. However, the transitional effects may also be used in other contexts, such as by fading or dissolving the last scene of a sequence to an empty scene in order to signify the end of that multimedia sequence.

According to the disclosed techniques, an encoding device detects a transitional effect associated with a multimedia sequence during the encoding of the multimedia sequence. This detection of the transitional effect may be based on conventional shot boundary detection algorithms or any other reliable method for detecting a transitional effect in a multimedia sequence. Alternatively, the encoding device may detect a signal or command in the source bitstream that indicates the presence of a transitional effect. The encoding device then generates information to encode the transitional effect in a non-conventional manner.

The decoder may simulate the transitional effect using interpolation techniques, such as techniques similar to those conventionally used to interpolate one or more frames between two coded frames for frame rate up-conversion (FRUC). The encoding device transmits transitional effect information as part of an encoded multimedia sequence to identify the transitional effect in the encoded multimedia sequence. In some embodiments, the transitional effect information may comprise metadata that can be used by the decoder to generate the transitional effect. In this case, the transitional effect information may aid the decoder in generating a transitional effect that approximates a transitional effect in the original video source bitstream. As an alternative, the transitional effect information may simply signal the presence of a transitional effect. In this case, the decoder may independently generate a transitional effect in response to the transitional effect information, which is not necessarily the same as the original transitional effect in the original video sequence.

Figure 1:
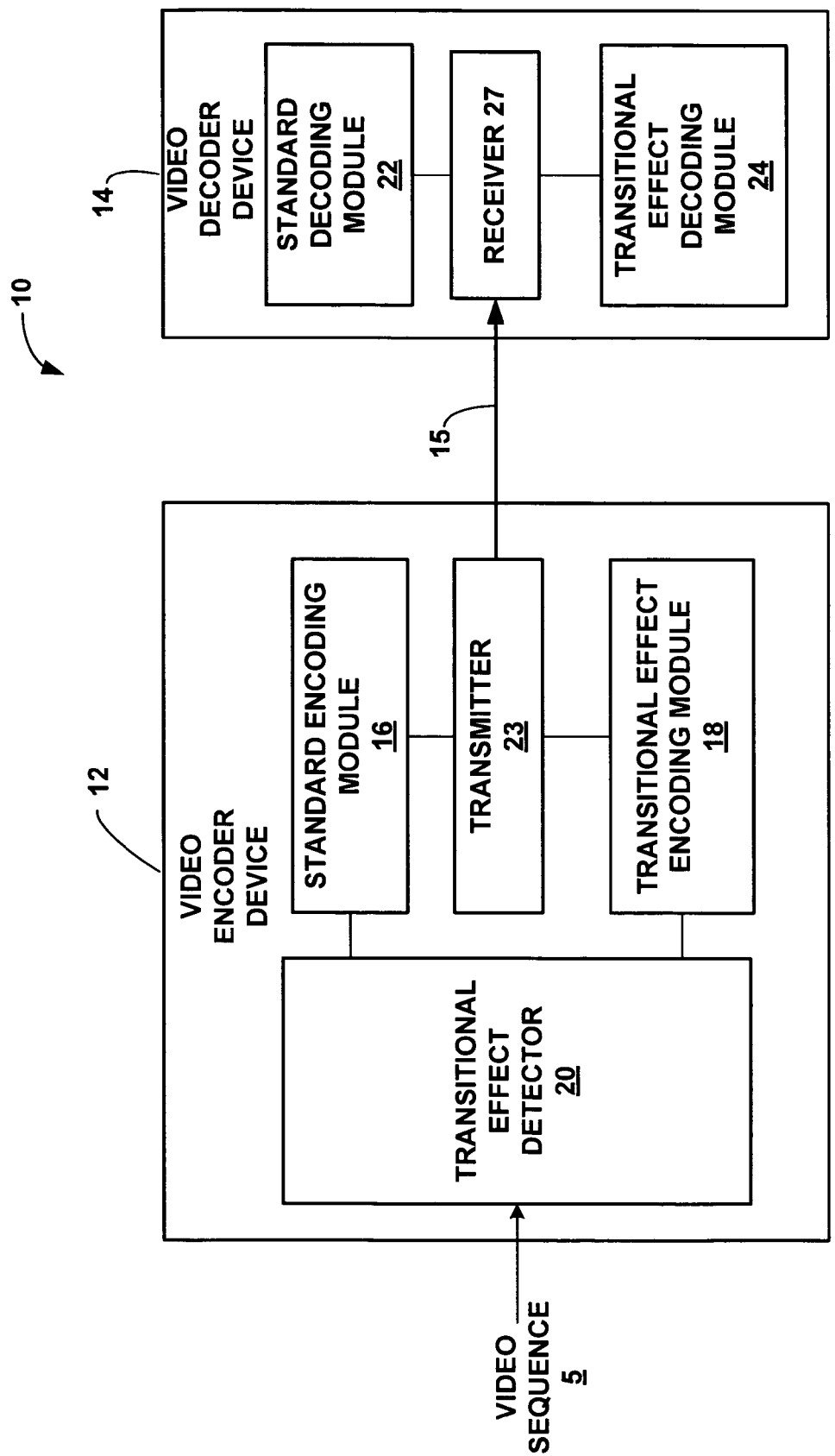
FIG. 1 is a block diagram illustrating a video encoding and decoding system that may implement transitional effect encoding and decoding techniques in accordance with this disclosure.

FIG. 1 is a block diagram illustrating a video encoding and decoding system 10 that may implement transitional effect encoding and decoding techniques in accordance with this disclosure. As shown, system 10 includes a video encoder device 12 and a video decoder device 14. Encoded multimedia sequences may be transmitted from video encoder device 12 to video decoder device 14 over a communication channel 15. To this end, video encoder device 12 and video decoder device 14 comprises a transmitter 23 and a receiver 27, respectively, to facilitate such communication, which may be wired or wireless communication.

Video encoder device 12, for example, may form part of a broadcast network component used to broadcast one or more channels of video to wireless subscriber devices. In this case, video encoder device 12 may transmit the encoded data to several video decoders (i.e., many subscribers of the broadcast service). A single video decoder device 14, however, is illustrated in FIG. 1 for simplicity. Video encoder device 12 and video decoder device 14 may be implemented as one or more processors, digital signal processors, application specific integrated circuits (ASICs), field programmable gate arrays (FPGAs), discrete logic, software, hardware, firmware, or any combinations thereof. The illustrated components of device 12 and device 14 may be included in one or more encoder or decoders, either of which may be integrated as part of an encoder/decoder (CODEC). However, the transmitter 23 and receiver 27 may be formed on different components or chips than the encoders, decoders or CODECs.

As noted, video encoder device 12 may form part of a broadcast network component used to broadcast one or more channels of video data. Examples of such components include wireless base stations or any infrastructure node used to broadcast the encoded video data. Video decoder device 14, on the other hand, may comprise a user-device that receives the encoded video. By way of example, video decoder device 14 may be implemented as part of a digital television, a wireless communication device, a portable digital assistant (PDA), a laptop computer or desktop computer, a digital music and video device, such as those sold under the trademark "iPod," or a radiotelephone such as cellular, satellite or terrestrial-based radiotelephone. The illustrated components in system 10 are those most applicable to implementation of the techniques described herein, although encoder device 12 and decoder device 14 may include many other components, if desired. Moreover, the techniques of this disclosure are not necessarily limited to use in a system like that of system 10, nor a broadcast system. The techniques may find application in any video coding environment in which transitional effects are used in a multimedia sequence to be encoded and/or decoded.

As shown in FIG. 1, video encoder device 12 receives a multimedia sequence 5, e.g., from a memory location. The memory, which is not illustrated in FIG. 1 for simplicity, may be part of encoder device 12 or may be an external memory that provides multimedia sequences to video encoder device 12. Multimedia sequence 5 may comprise a live real-time video or video and audio sequence to be coded and transmitted as a broadcast, or may comprise a pre-recorded and stored video or video and audio sequence to be coded and transmitted as a broadcast or on-demand.

In any case, video encoder device 12 facilitates encoding of multimedia sequence 5, and implements the techniques of this disclosure to improve such encoding when a transitional effect is encountered within multimedia sequence 5. Video encoder device 12 includes a transitional effect detector 20, which performs the detection of a transitional effect associated with sequence 5. For example, transitional effect detector 20 may sample multimedia sequence 5, looking for one or more earmarks of a transitional effect, such as a set of frames that create a fading effect, a wiping effect, a dissolving effect, a sliding effect, a breaking effect, a flipping effect, or a wide range of other types of visual effects used to transition away from a current scene. As one example, transitional effect detector 20 may implement one or more so-called shot boundary detection algorithms, or any other reliable method for detecting a transitional effect associated with a multimedia sequence. In this way, transitional effect detector 20 identifies the existence of a transitional effect within multimedia sequence 5.

Transitional effects can present challenges in video coding. In particular, transitional effects usually do not exhibit relative scene motion that allows for highly effective predictive-based video coding. Furthermore, transitional effects are often used at scene changes, where a viewer's perception is not as sensitive to high levels of signal noise. When conventional encoders are used to encode a transitional effect in a standard way, using predictive-based techniques, the level of compression may be very limited and video quality can be poor. Moreover, the inefficient standard-style coding of such transitional effects may be unnecessary from a quality standpoint insofar as a viewer's perception is typically not as sensitive to high levels of signal noise in transitional effects as in full motion portions of a multimedia sequence. In other words, when scenes change, a user can typically tolerate a higher noise level without perceiving any subjective quality reductions.

For these and other reasons, the techniques of this disclosure provide for different coding methods for transitional effects relative to the other non-transitional portions of the multimedia sequence. In particular, video encoder device 12 includes both a standard encoding module 16 and a transitional effect encoding module 18, which may be formed in one encoder or in multiple encoders. Standard encoding module 16 applies standard predictive-based encoding techniques, such as motion estimation and motion compensation in order to code frames of multimedia sequence 5. Standard encoding module 16 may also apply non-motion coding techniques such as spatial estimation and intra-prediction for some of the frames. According to standard predictive-based techniques, standard encoding module 16 may also include various units for entropy encoding, scanning, quantization, transformation, and possibly deblock filtering. These units are applied with respect to normal (non-transitional) frames to facilitate standard predictive-based encoding of such frames. However, for any frames that are identified as being a transitional effect, transitional effect encoding module 18 performs different, non-standard, encoding techniques.

In particular, for frames that comprise a transitional effect, transitional effect encoder 18 generates information that can be used by video decoder device 14 to simulate the transitional effect. Decoder device 14 uses the information to simulate the transitional effect by reconstructing frames of the effect, rather than separately decoding such frames. The information may comprise metadata that can be used by decoder device 14 in a manner similar to FRUC techniques. For example, the metadata may identify a type of effect so that that type of effect can be simulated at video decoder device 14 for those specific frames that comprise the transitional effect. In more simple cases, the metadata may simply identify the existence of a transitional effect, without regard to the type of effect, in which case, video decoder device 14 may simulate a transitional effect that is not necessarily the same as the original effect. In more complex cases, however, the metadata may include information to identify the period of the effect, possibly one or more geometry maps associated with the frames of the transitional effect, or other data to assist the simulation of the effect at video decoder device 14. In most cases, however, the geometry maps used to simulate the transitional effect can be stored or generated on the decoder side, and applied based on an indication of the type of effect and the period associated with the effect. According to the disclosed techniques the need to encode, send and decode full predictive frames for the transitional effects can be avoided, saving processing overhead at the encoder and decoder, and saving bandwidth over a wireless communication channel.

Video decoder device 14 includes both a standard decoding module 22 and a transitional effect decoding module 24, which may be formed in one decoder or in multiple decoders. Standard decoding module 22 handles any frames that are encoded by standard predictive-based motion techniques or nonpredictive-based spatial techniques. To this end, standard decoding module 22 may include a motion compensator and a spatial compensator. Standard decoding module 22 may also include units for entropy decoding, inverse scanning, inverse quantization, inverse transforming, and possibly deblock filtering. These standard components are not illustrated in FIG. 1, for simplicity. An encoded video sequence is transmitted from transmitter 23 of encoding device 12 to receiver 27 of decoding device 14 over communication channel 15, which may be a wireless channel.

Transitional effect decoding module 24 handles the decoding of transitional effects based on information sent from video encoder device 12. The information sent to decode the transitional effects may be much less than would be otherwise needed to code such effects using standard techniques. Essentially, video encoder device 12 generates information identifying a transitional effect, and possibly other information about the effect, such as the period associated with the effect, the type of effect and the beginning and ending scenes associated with the effect. This information is received by decoding device 14 via receiver 27, and transitional effect decoding module 24 simulates the effect in video decoder device 14 in response to the information. For example, given the beginning and ending scenes, an indication of a type of effect, and a period of the effect, a simulation of that effect can be re-created by transitional effect decoding module 24 without needing the more extensive coded information that would otherwise be needed to code such effects using standard techniques.

Figure 2:
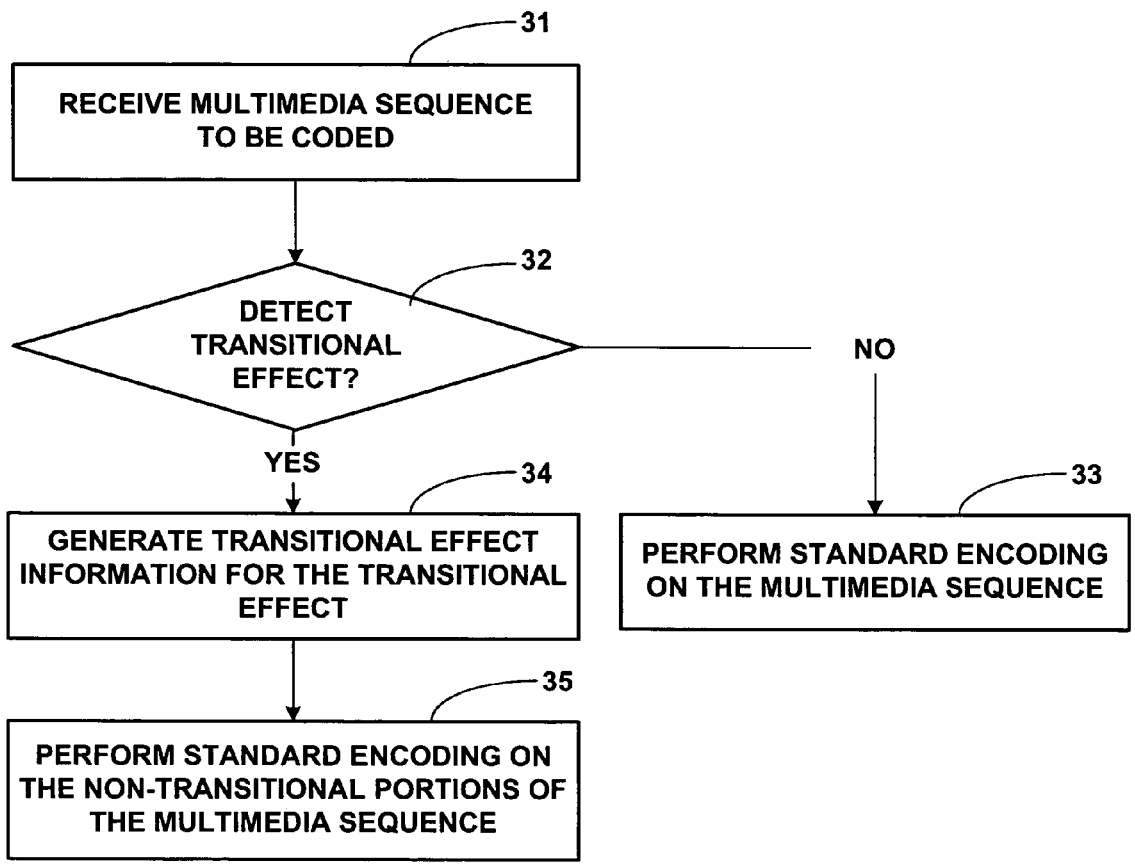
FIG. 2 is a flow diagram illustrating a transitional effect encoding technique according to this disclosure.

FIG. 2 is a flow diagram illustrating an encoding technique according to this disclosure. As shown in FIG. 2, video encoder device 12 receives a multimedia sequence 5 to be coded (31). Transitional effect detector 20 detects whether any given portion of multimedia sequence 5 comprises a transitional effect (32), such as by implementing shot boundary detection algorithms, or any other reliable method for detecting a transitional effect associated with a multimedia sequence. If transitional effect detector 20 does not identify any transitional effect (no branch of 32) standard encoding module 16 is invoked for the encoding of the entire multimedia sequence 5. In this case, standard encoding module 16 performs standard predictive-based motion encoding and nonpredictive-based spatial encoding on multimedia sequence 5.

However, if transitional effect detector 20 identifies a transitional effect associated with multimedia sequence 5, transitional effect encoding module 18 is invoked for the transitional effect portion of multimedia sequence 5. In this case, transitional effect encoding module 18 generates transitional effect information for the transitional effect (34), which can be used by video decoder device 14 to simulate the transitional effect. Such information could be information helpful in interpolation or an indication of the presence, position and timing of the transitional effect, or possibly just a flag indicating that a transitional effect needs to be generated at the decoder. In any case, standard encoding module 16 still performs standard predictive-based motion encoding and standard nonpredictive-based spatial encoding on the non-transitional portions of multimedia sequence 5 (35).

Figure 3:
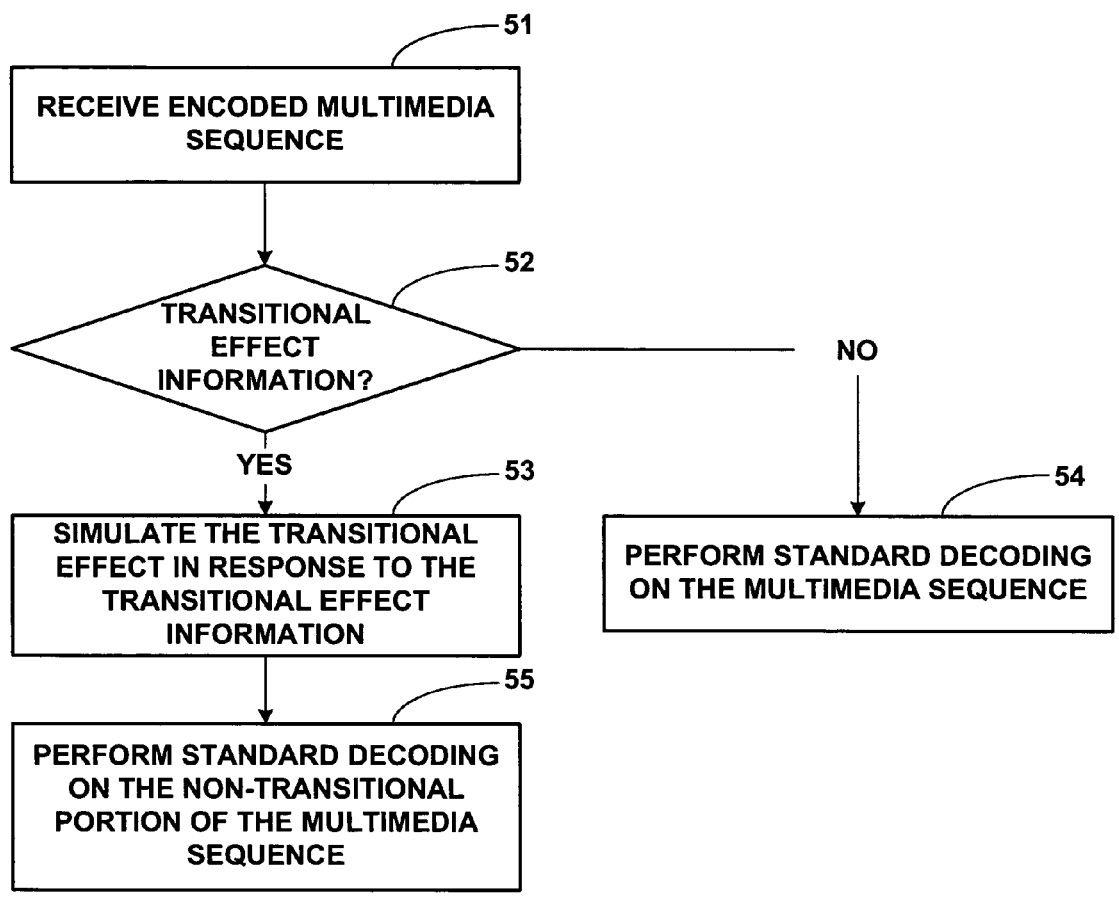
FIG. 3 is a flow diagram illustrating a transitional effect decoding technique according to this disclosure.

FIG. 3 is a flow diagram illustrating a decoding technique according to this disclosure. As shown in FIG. 3, receiver 27 of video decoder device 14 receives an encoded multimedia sequence, e.g., via communication channel 15 from transmitter 23 of encoding device 12 (51). If the received multimedia sequence does not include transitional effect information, which identifies the presence of a transitional effect, standard decoding module 22 is invoked for the decoding of the entire multimedia sequence. In this case, standard decoding module 22 performs standard predictive-based motion decoding and nonpredictive-based spatial decoding.

However, if the received multimedia sequence includes transitional effect information, which identifies the presence of a transitional effect, transitional effect decoding module 24 is invoked for the transitional effect portion of the received multimedia sequence. In this case, transitional effect decoding module 24 simulates the transitional effect in response to the transitional effect information (53). Again, this simulation by transitional effect decoding module 24 may be similar to interpolation techniques used to support FRUC techniques or encoder assisted FRUC techniques in which frames are created to simulate the desired effect. For the non-transitional portion of the received multimedia sequence, standard decoding module 22 still performs standard predictive- and nonpredictive-based decoding (55).

FIGS. 4-16 are conceptual diagrams illustrating one respective frame within respective transitional effects that may be coded according to the techniques of this disclosure. The different exemplary scenarios illustrated in FIGS. 4-16 will be used to explain different types of transitional effect information or metadata that can be used to code the transitional effects, and allow for good simulation of the respective effect at the decoder. Again, in some simple cases, the metadata may simply identify the existence of a transitional effect, without regard to the type of effect, in which case, video decoder device 14 may simulate a transitional effect that is not necessarily the same as the original effect. In more complex cases, however, the metadata may include information to identify the type of the effect, the period of the effect, the beginning and ending frames of the effect, and possibly other data to assist the simulation of the effect at video decoder device 14. In these cases, the information may be used by the decoder to aid in the simulation of the transitional effect.

Figure 4:
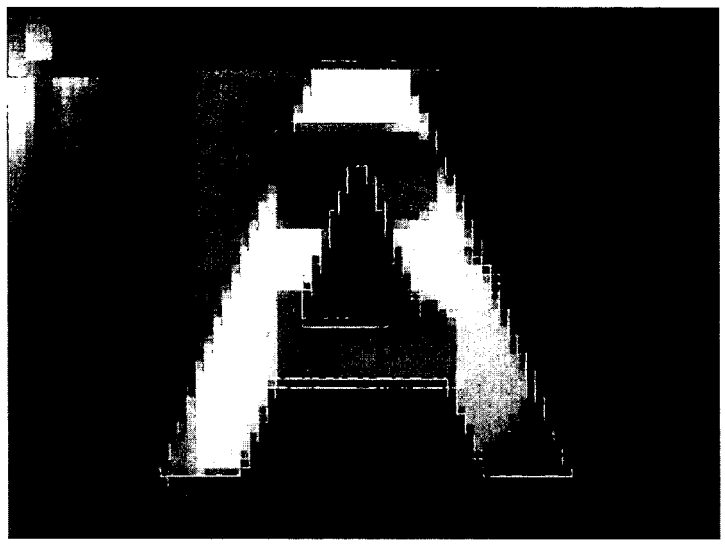
FIGS. 4-16 are conceptual diagrams illustrating exemplary frames of different transitional effects that may be coded according to the techniques of this disclosure.

FIG. 4 is a conceptual diagram illustrating one frame 62 of a fading effect, in this case a cross-fade. In this case, scene A is fading into scene B over a period P. Fading effects may include a "fade-in," in which case scene B fades in from an empty scene, and a "fade-out," in which case scene A fades out to an empty scene. FIG. 4 illustrates a "cross-fade," in which scene A is fading into scene B. Technically, there may be no difference in handing these cases of fade-in, fade-out, and cross-fade. Fade-in and fade-out can be considered the same as a cross-fade, but the scene A or B is just considered a blank scene for fade-ins or fade-outs.

In any case, for the fading effects such as the cross-fade illustrated in frame 62 of FIG. 4, weighted bi-directional motion compensation can be used with zero motion vectors. In this case, the information used by decoding device 14 to code the transitional effect may identify the effect as a fading effect and define a period for the effect. One copy of scene A and one copy of scene B may also be included in the transitional effect information. However, at least some information for intervening frames that extend between scenes A and B may be omitted.

Given the relatively limited information received from video encoder device 12, video decoder device 14 can simulate a fading effect. In particular, transitional effect decoding module 24 can reconstruct a set of frames of the transition based on the copy of scene A, the copy of scene B and the period associated with the fading transition from scene A to scene B. In this case, transitional effect decoding module 24 can perform weighted bi-directional reconstruction of multimedia frames using motion vectors of zero values. The weighting for scene A and scene B can change relative to one another over the period to create a set of transitional frames, and may be stored in one or more lookup tables (LUTs) that is accessed by transitional effect decoding module 24 during the decoding process. The period of the fading effect may define a number of indices, which can be applied to the LUTs to select the weightings used for each successive frame of the effect. Importantly, however, the information that needs to be sent to facilitate this reconstruction is an indication of the type of fading effect, copies of scene A and scene B, and the period. The reconstruction of the frames over that period can be performed solely by transitional effect decoding module 24. In this manner, the information needed to convey the transitional effect in the video coding scheme can be significantly reduced.

Figure 5:
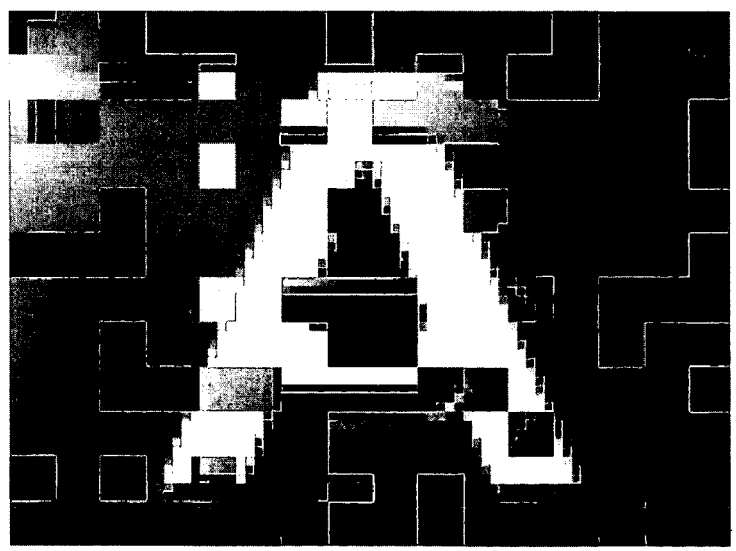

FIG. 5 is a conceptual diagram illustrating one frame 64 of a fading effect, in this case a dissolve effect. In the dissolve effect, scene A is dissolving into scene B over a period P. Dissolving effects may also comprise "dissolve-in," in which case scene B dissolves in from an empty scene, or a "dissolve-out," in which case scene A dissolves out to an empty scene. FIG. 5 illustrates a "cross-dissolve," in which case, scene A is dissolved into scene B. Dissolve-in and dissolve-out can be considered the same as a cross-dissolve, but scene A or B is just considered a blank scene for dissolve-ins or dissolve-outs.

In any case, for the dissolving effects such as illustrated in frame 64 of FIG. 5, a couple of options are possible. In one case, geometric maps are pre-defined at transitional effect decoding module 24 to define bi-directional motion with motion vectors of zero. The maps define, for each successive frame of the transitional effect, which pixels are taken from scene A and which are taken from scene B. The number of maps used in the dissolve may be defined by the period associated with the transitional effect. The pre-defined maps for the transitional effect may be stored in one or more lookup tables (LUTs), which are accessible to transitional effect decoding module 24. The period of the effect may define indices, which can be applied to the LUTs to select the pre-defined maps used for each successive frame of the effect.

In another case, however, geometric maps can be generated at video decoder device 14 in a random fashion. Like the other dissolve example, in this case, the transitional effect information may identify the scenes A and B, the dissolve effect, and the period. Transitional effect decoding module 24 can then generate a set of dissolving maps based on random number generation. This case results in a dissolve effect, although the specific pixels that dissolve may be randomly selected at the video decoder device 14. Thus, any subsequent dissolve effects would differ from one another in a random fashion.

Figure 6:
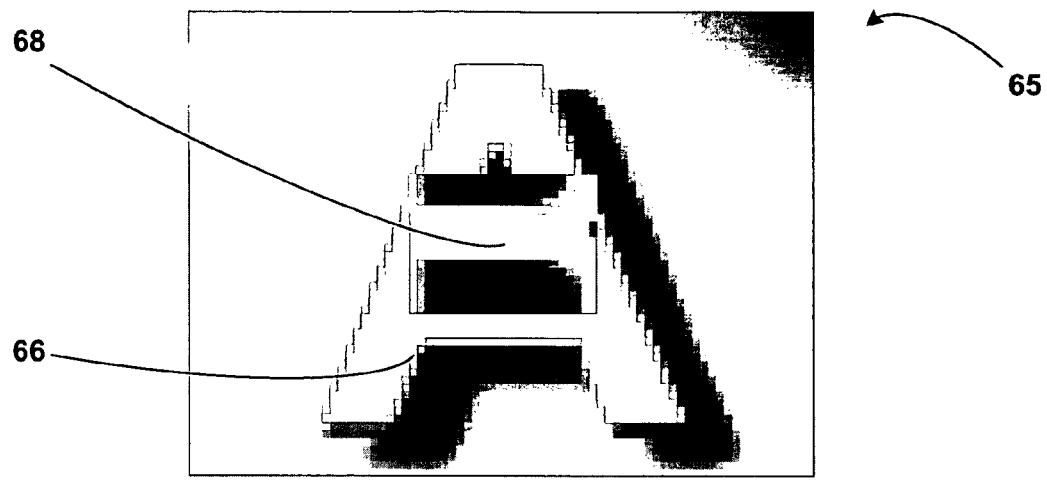
Figure 7:
Figure 8:
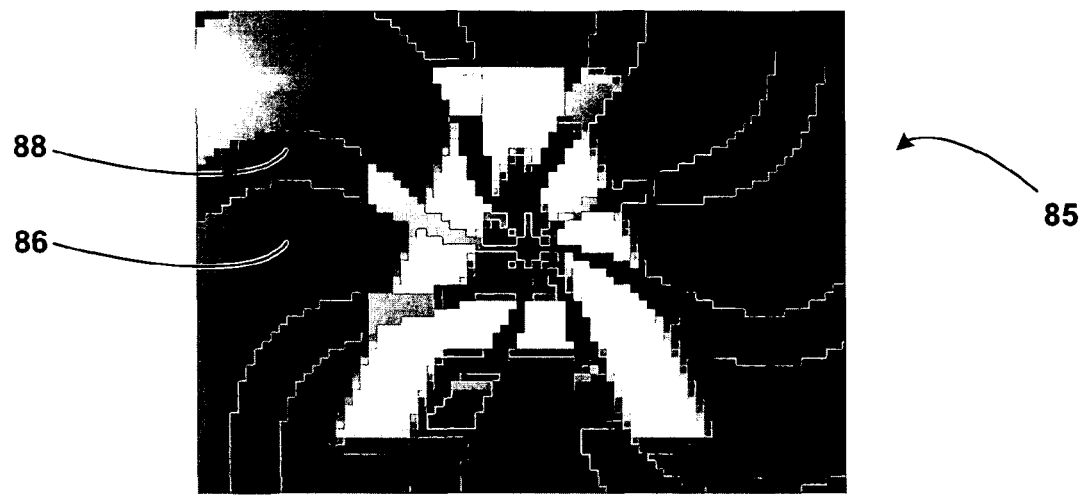

FIGS. 6-8 are conceptual diagrams illustrating a box effect, a slide effect and a curve effect, respectively. In the box effect shown in frame 65 of FIG. 6, scene B 68 emerges from scene A 66 in an expanding box. In the slide effect shown in frame 75 of FIG. 7, scene B 78 emerges from scene A 76 in a sliding fashion. In the curve effect shown in frame 85 of FIG. 7, scene B 88 emerges from scene A 86 in a set of curve areas that expand over the scene. Like the effects of FIGS. 4 and 5, the effects of FIGS. 6-8 could also be used with blank scenes for scene A or for scene B. In any case, the information used to code this effect may identify the type of transitional effect as a box effect, and define the period. Copies of scene A and scene B are also used to create the simulation.

In particular, transitional effect decoding module 24 can simulate the transitional effect of FIGS. 6-8 according to pre-defined maps for the each of these types of transitional effects. Given scene A, scene B, the type of transitional effect and the period associated with the effect, transitional effect decoding module 24 may select a set of pre-defined maps, which may be stored in one or more LUTs. The selected maps can define the geometry of each successive frame over the transitional sequence in order to simulate the transitional effect. In other words, transitional effect decoding module 24 can perform bi-directional reconstruction of each successive frame using a map for each frame that defines which pixels (or blocks of pixels) are taken from scene A and which pixels (or blocks of pixels) are taken from scene B. The motion vectors for each pixel (or blocks of pixels) would be zero for each respective pixel or block. LUTs may be pre-defined for each type of transitional effect, and the selections from the LUTs could be made based on the period of the translation, e.g., skipping one or more maps in the LUTs if the period is short.

In still other examples, the geometric maps for any of the effects described in this disclosure could be generated at the encoding device 12 and sent to the decoding device 14. In other words, the effects could be simulated at the decoding device 14 by generating the geometric maps for the respective effect, or by applying maps that are generated at the encoding device 12 and sent to the decoding device 14 as part of the transitional effect information. The generation of the geometric maps by the encoding device 12 can reduce complexity of decoding device 14, which is typically less capable of computational complexity than encoding device 12, particularly in broadcast scenarios. On the other hand, the generation of the geometric maps by the decoding device 14 achieves distinct advantages insofar as this reduces the amount of information need to transfer for effective coding of the transitional effect. In this case, simulation of the effect at the decoder can allow for a reduction of information transferred between encoding device 12 and decoding device 14 to effectively code the transitional effects, which can be very useful particularly when the information is being transferred wirelessly.

Figure 9:
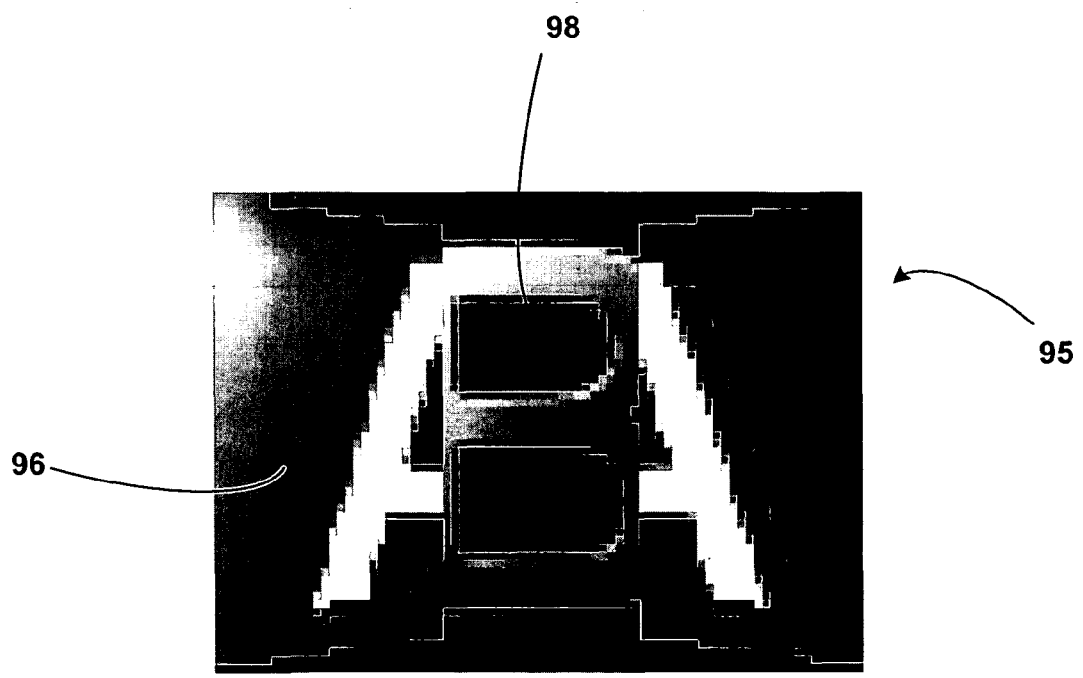

FIG. 9 is another conceptual diagram, which illustrates a door opening effect. In frame 95 of FIG. 9 scene B 98 emerges as doors open to remove scene A 96. Like the other effects, the door opening effect of FIG. 9 could also be used with blank scenes for scene A or for scene B. In any case, the information used to code this effect may identify the type of transitional effect as an open door effect, and define the period. Copies of scene A and scene B are also used to create the simulation.

In this case, the frames of the transitional sequence are segmented into a forward prediction part and a backward prediction part. The forward prediction part is decoded differently than the backward prediction part. A set of geometric maps can define the respective portions of the scene that are forward predicted and backward predicted over the period of the transition. Motion vectors associated with the emerging scene B are zero, while motion vectors associated with the opening door of scene A may be smoothed and scaled to create this effect. Thus, the opening doors for scene A 96 are scaled and smoothed so that the full scene A is included in the opening doors, yet adjusted to create the opening door effect. Like the other examples, the scaling and smoothing factors and any geometry maps associated with the effect can be pre-stored in video decoder 12, e.g., as one or more LUTs in transitional effect decoding module 24.

Consequently, the smoothing and scaling of the motion vectors associated with scene A can be performed at video decoder device 14 by transitional effect decoding unit 24, thereby eliminating the need to send complex motion information in the encoded data. Transitional effect encoding module 18 of encoding device 12 simply identifies the open door effect and the period, and sends copies of scene A and scene B. Transitional effect decoding module 24 of decoding device 24 can then simulate this effect using differential decoding of the emerging area for scene B 98 with zero motion vectors, and the opening doors of scene A 96 using smoothing and scaling of the motion vectors. Scenes A and B may be spatially compressed for added efficiency.

Figure 10:
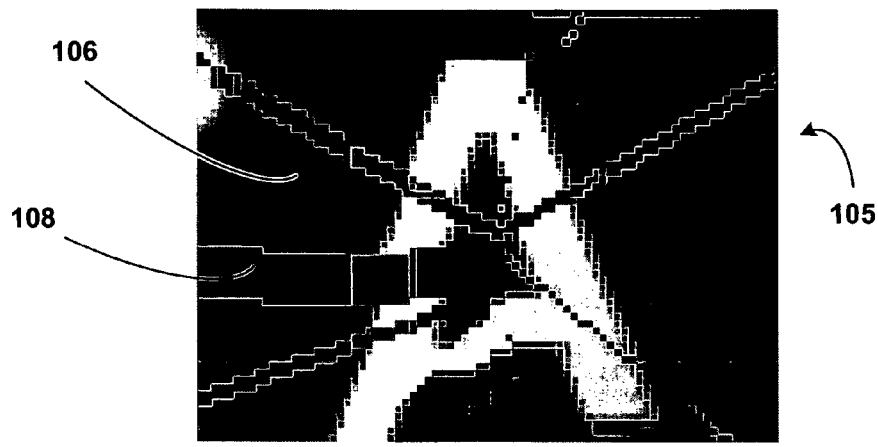
Figure 11:
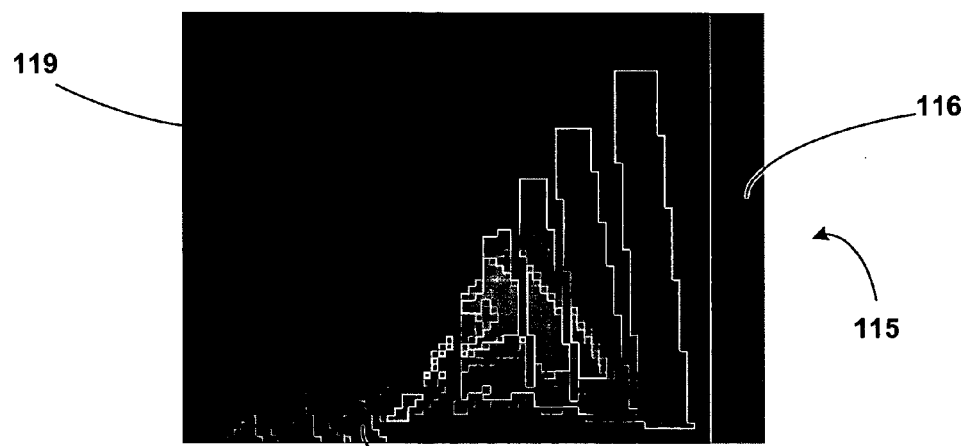
Figure 12:
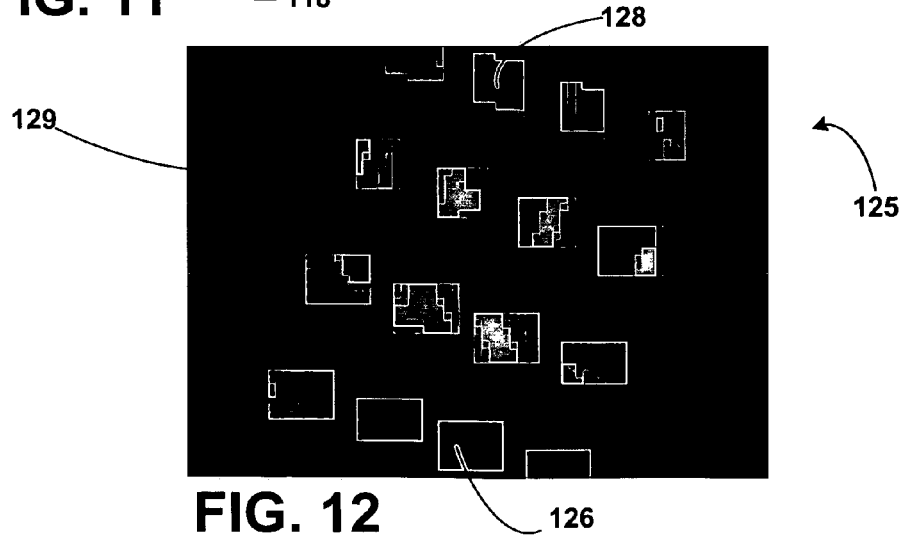

FIGS. 10-12 illustrate different breaking effects, which may also be simulated according to the techniques of this disclosure. In frame 105 of FIG. 10 scene A 106 shatters into scene B 108. In frame 115 of FIG. 11 scene A 116 breaks into bars to expose an empty scene 119 and scene B 118 emerges in a broken manner, eventually reconstructing the B scene. In frame 125 of FIG. 12, scene A 126 breaks into pieces to expose empty scene 129 and then scene B 128 emerges as pieces that come together to form the B scene.

The examples of FIGS. 10-12 can also be simulated by decoder device 14, based on transitional effect information that identifies the type of effect, the period, and the content of the beginning scene A and the ending scene B. In this case, the frames are segmented into forward and backward prediction parts, scaling and rotation is performed in both the forward and backward parts to effectuate the respective breaking transitional effects.

Figure 13:
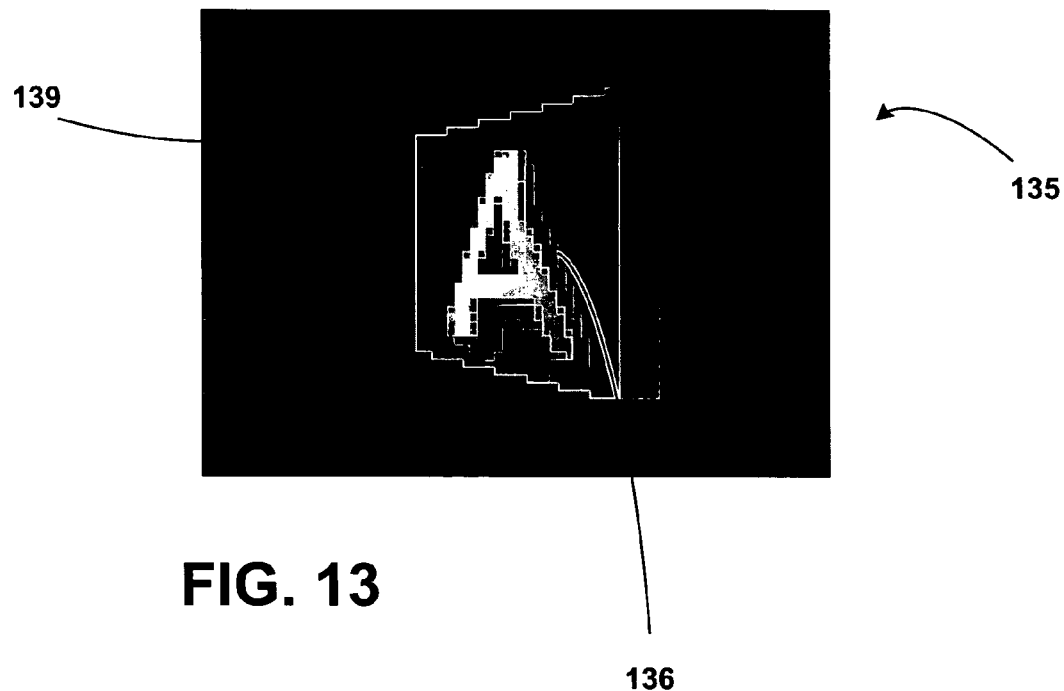

FIG. 13 shows a frame 135 of an exemplary flipping effect. In this case, scene A 136 reduces its size as it rotates, eventually flipping into scene B (not shown), which enlarges over successive frames of the transition until it encompasses the full scene. Background 139 is shown as being empty in this example. Like the examples of FIGS. 10-12, to simulate the effect of FIG. 13, the frames are segmented into forward and backward prediction parts. In this case, however, scaling and rotation is performed in both the forward and backward parts to effectuate the respective breaking transitional effects. The effect can be simulated by decoder device 14, based on transitional effect information that identifies the type of effect, the period, and the content of the beginning scene A and the ending scene B. The scaling, rotation and geometry of the effect can be pre-stored, e.g., in one or more LUTs, and selected for every successive scene of the effect based on the period identified for the effect.

Figure 14:
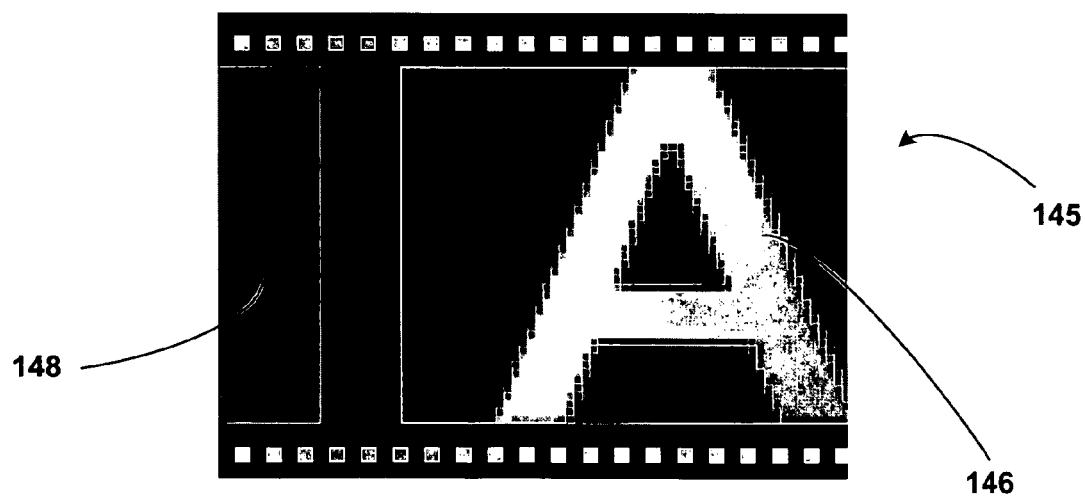

FIG. 14 illustrates a frame 145 movie film effect in which scene A 146 moves out as scene B 148 moves in. The motion is translational. In this case, motion vectors are defined in a uniform manner, and two sides of the border line use different prediction directions. Like the other transitional effects, this effect can be simulated at video decoder device 14 based on information that defines the type of transitional effect, the period and the content of scenes A and B. Accordingly, standard prediction based encoding and decoding for every frame of the transitional portion of the sequence can be avoided, and transitional effect decoder module 24 can simulate this effect based on less information than would otherwise be needed.

Figure 15:
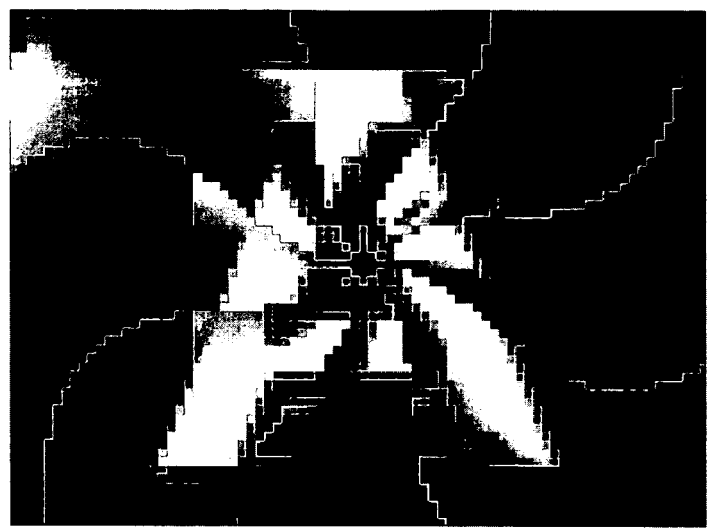

FIG. 15 illustrates a frame 155 that includes a combination of two transitional effects. In this case, the effect is a combination of the curve effect shown in FIG. 8 and the cross-fade effect shown in FIG. 4. Given that the effect of FIG. 15 is a combination of these two different effects, transitional effect decoder module 24 can simulate this effect by combining the techniques used for the curve effect and the cross-fade effect. In this case, weighted bi-directional reconstruction of multimedia frames associated with the transitional effect using motion vectors of zero values is performed by transitional effect decoder module 24, and the prediction weights are defined according to the pre-defined maps of the curve effect.

Figure 16:

Some complex effects, such as the ripple effect illustrated in frame 165 of FIG. 16, may be too complex to be identified as a combination of simple effects. In this case, physical warping, cross-fading and other random motion may be introduced to simulate the effect at video decoder device 14. Random and/or non-linear distortion may also be used to simulate such complex transitional effects. In these complex cases, instead of transmitting every detail of every block, statistic numbers may be sent, such as a ratio of blocks being updated to the new scene in the cross-dissolve, and the ratio of bright pixels in white noise. Given such information, complex ripple-like effects may be simulated.

In some cases, however, particularly if content can be modified, it may be desirable to substitute a simpler transition effect, such as a cross-fade, for a complex effect, such as the ripple effect. In this case, encoder device 12 may simply identify the presence of the transition, and decoder device 14 may simulate a transitional effect that is not necessarily the same as that in the original sequence. In this case, the viewer would still view a transition, yet the complexity could be significantly reduced by avoiding the costly encoding and decoding needed to convey the complex transitional effect.

When performing weighted motion compensation for translation effect simulation at the decoder, the weightings may be smoothed across frames over the period of the transitional effect. When smoothing is performed on motion vectors for a given effect, such smoothing is not necessarily limited to immediately adjacent neighbors, but may include smoothing of the whole segment or portion being smoothed. Smoothing is also not limited to translational motion, and may include scaling and rotation, for instance. All of the smoothing, weighting, filtering and the like may be pre-defined at the decoder for a given transitional effect.

Figure 17:
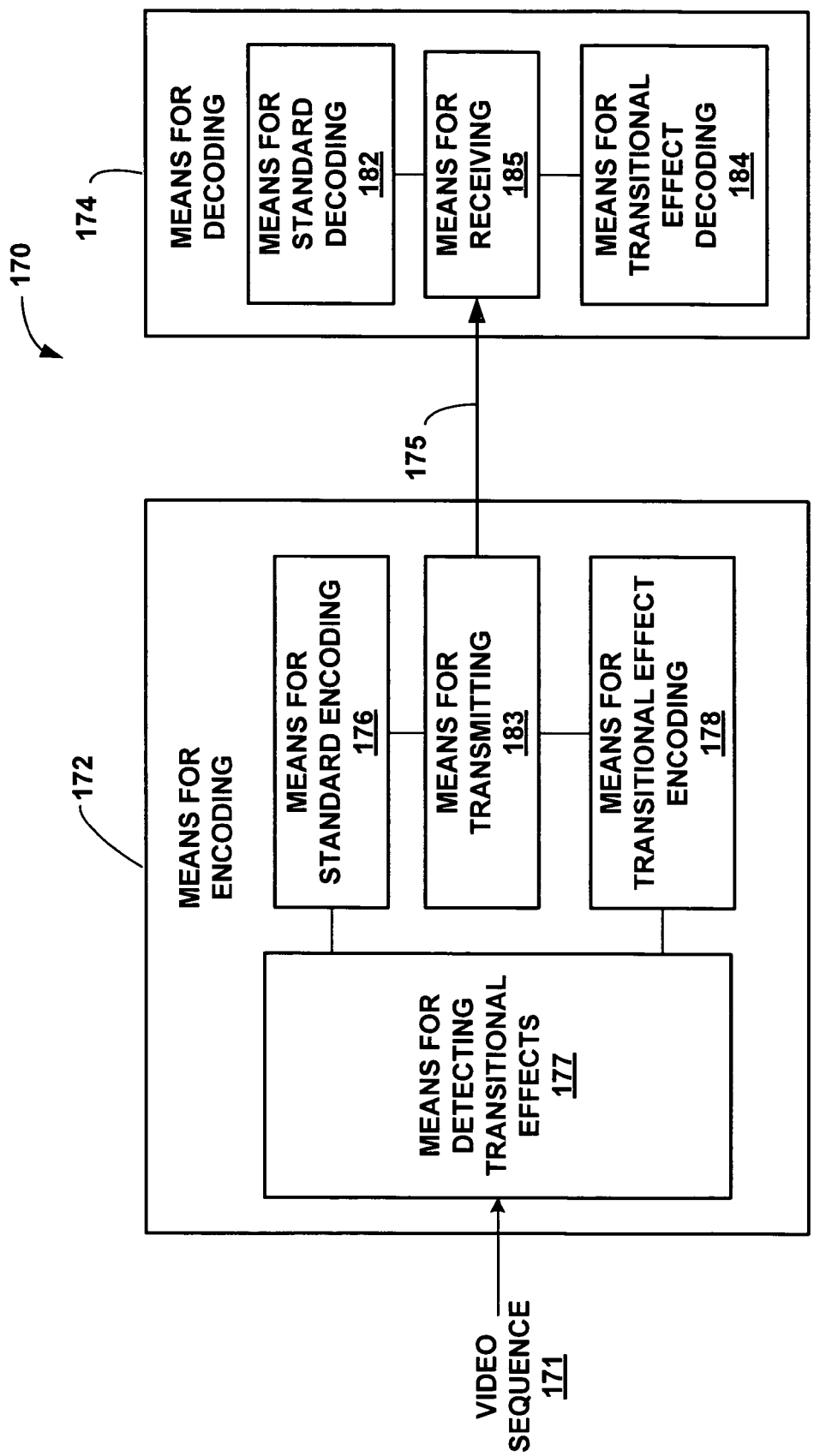
FIG. 17 is another block diagram illustrating an exemplary video encoding and decoding system that may implement transitional effect encoding and decoding techniques in accordance with this disclosure.

FIG. 17 is another block diagram illustrating a exemplary video encoding and decoding system that may implement transitional effect encoding and decoding techniques in accordance with this disclosure. As shown, system 170 includes means for encoding 172 and means for decoding 174. Means for encoding 172 may comprise an encoder and means for decoding may comprise a decoder. Means for encoding 172 receives a multimedia sequence 171, e.g., from a memory location. The memory, which is not illustrated in FIG. 17 for simplicity, may be part of means for encoding 172 or may be an external memory that provides multimedia sequences to means for encoding 172.

Means for encoding 172 facilitates encoding of multimedia sequence 171, and implements the techniques of this disclosure to improve such encoding when a transitional effect is encountered in a portion of multimedia sequence 171. Means for encoding 172 includes a means for detecting transitional effects 177, which performs the detection of a transitional effect associated with multimedia sequence 177. Means for detecting 177 may comprise a detector. In system 170, different coding methods are used for transitional effects relative to the other non-transitional portions of multimedia sequence 177.

Means for encoding 172 includes both a means for standard encoding 176 and a means for transitional effect encoding 178, which may be referred to as first and second means for encoding. Means for standard encoding 176 and means for transitional effect encoding 178 may comprise separate encoders or may be implemented in a common encoder. Means for standard encoding 176 applies standard predictive-based encoding techniques, such as motion estimation and motion compensation in order to code frames of multimedia sequence 171. Means for standard encoding 176 may also apply non-motion coding techniques such as spatial estimation and intra-prediction for some of the frames. Means for transitional effect encoding 178, on the other hand, performs non-standard decoding techniques as described herein. In particular, means for transitional effect encoding 178 codes metadata which may be used by means for decoding 174 to facilitate simulation of the transitional effects. Encoded video sequences are transferred between the means for encoding 172 and the means for decoding 174 over communication channel 175 via means for transmitting 183 and means for receiving 185. Means for transmitting 183 may comprises a transmitter and means for receiving 185 may comprise a receiver. Alternatively, means for transmitting 183 and means for receiving 185 may comprise transceivers that can both transmit and receive information.

Means for decoding 174 includes a means for standard decoding 182 and a means for transitional effect decoding 184, which may be referred to as first and second means for decoding. Means for standard decoding 182 and means for transitional effect encoding 184 may comprise separate decoders or may be implemented in a common decoder. Means for standard decoding 182 performs standard decoding techniques, such as motion compensation decoding and intra-decoding of any intra-coded frames. Means for transitional effect decoding 184, however, performs non-standard techniques, essentially simulating any transitional effects based on the metadata transmitted for such effects as described herein.

A number of examples of information that can be sent to facilitate the simulation of different transitional effects have been described. In general, the techniques of this disclosure may implement interpolation techniques similar to those used for some frame rate up-conversion (FRUC) techniques in order to allow for encoder-assisted transitional effect simulation at the decoder. In this case, for transitional effects, FRUC-like techniques may be used instead of conventional predictive-based coding in order to improve data compression in a coded multimedia sequence and/or improve the visual quality of the transitional effect. The beginning and ending scenes (and possibly some intermediate scenes) are sent to the decoder, and the decoder interpolates the other frames to create the transitional effect.

In any case, the techniques described herein may be implemented in hardware, software, firmware, or any combination thereof. If implemented in software, the techniques may be realized in part by a computer readable medium (or other machine-readable medium) comprising program code containing instructions that, when executed, performs one or more of the techniques described above. In this case, the computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The instructions may be executed by one or more processors or other machines, such as one or more digital signal processors (DSPs), general purpose microprocessors, an application specific integrated circuits (ASICs), field programmable logic arrays (FPGAs), or other equivalent integrated or discrete logic circuitry. The machine that executes the instructions may generally comprise an apparatus. In some embodiments, the functionality described herein may be provided within dedicated software modules or hardware units configured for encoding and decoding, or incorporated in a combined video encoder-decoder (CODEC).

Various embodiments have been described. Nevertheless, various modifications may be made to the techniques described without departing from the scope of the following claims. For example, affine motion may be used to define the maps and pixel values in simulations according to some types of translation effects. Affine motion allows for six degrees of freedom, and can code translation, compression or expansion. Acceleration motion could also be used to define the simulations. Moreover, the techniques of this disclosure could also be employed by applying equations rather than lookup tables (LUTS) in the encoder or decoder. These and other embodiments are within the scope of the following claims.

The invention claimed is:

1. A method of decoding an encoded multimedia sequence by a video decoder, the method comprising:
   receiving information as part of the encoded multimedia sequence, wherein the information includes a transitional effect associated with a plurality of frames of the multimedia sequence, and a beginning frame and an ending frame of the plurality of frames associated with the transitional effect with at least some frame data being incomplete therebetween; and
   decoding the encoded multimedia sequence including simulating the transitional effect in response to the information, wherein simulating the transitional effect comprises reconstructing, based on the information, the frames between the beginning frame and the ending frame and performing weighted bi-directional reconstruction of the plurality of frames associated with the transitional effect using at least one of motion vectors of zero values or predefined maps of the transitional effect.

2. The method of claim 1, wherein the information identifies a type of transitional effect, the method further comprising simulating the transitional effect based on the type of transitional effect.

3. The method of claim 1, wherein the information includes a type of transitional effect and a period associated with the transitional effect, and wherein simulating the transitional effect comprises simulating the type of transitional effect over the period.

4. The method of claim 1, wherein the information includes a type of transitional effect and a period associated with the transitional effect, and wherein simulating the transitional effect includes generating one or more geometry maps.

5. The method of claim 4, wherein the one or more geometry maps are generated from one or more lookup tables.

6. The method of claim 1, wherein the information identifies the transitional effect as a fade effect and wherein simulating the transitional effect comprises performing the weighted bi-directional reconstruction of the plurality of frames associated with the fade effect using the motion vectors of zero values.

7. The method of claim 1, wherein the information identifies the transitional effect as a dissolve effect, and wherein simulating the transitional effect comprises randomly generating the dissolve effect.

8. The method of claim 1, wherein the information identifies the transitional effect as an effect in which a second scene emerges over a first scene and simulating the transitional effect comprises performing the weighted bi-directional reconstruction of the plurality of frames associated with the transitional effect according to the pre-defined maps in which the second scene emerges over the first scene using the motion vectors of zero values.

9. The method of claim 1, wherein simulating the transitional effect comprises segmenting at least one frame of a transitional sequence into a forward prediction part and a backward prediction part and decoding the forward prediction part differently than the backward prediction part.

10. The method of claim 1, wherein simulating the transitional effect comprises performing the weighted bi-directional reconstruction of the plurality of frames associated with the transitional effect according to the pre-defined maps of the transitional effect.

11. A method of encoding a multimedia sequence by a video encoder, the method comprising:
   detecting a transitional effect associated with a plurality of frames of the multimedia sequence during encoding of the multimedia sequence; and
   generating information as part of an encoded multimedia sequence to identify the transitional effect, wherein the information includes a beginning frame and an ending frame of the plurality of frames with at least some frame data being incomplete therebetween such that a decoder may reconstruct, based on the information, the frames between the beginning frame and the ending frame by performing weighted bi-directional reconstruction using at least one of motion vectors of zero values or predefined maps of the transitional effect.

12. The method of claim 11, wherein the information includes identification of a type of transitional effect.

13. The method of claim 11, wherein the information includes identification of a type of transitional effect and a period associated with the transitional effect.

14. The method of claim 11, wherein the information includes identification of a type of transitional effect and one or more geometry maps associated with the transitional effect.

15. The method of claim 11, further comprising transmitting the information to a decoder as part of the encoded multimedia sequence.

16. The method of claim 11, wherein the information includes identification of a type of transitional effect and a period associated with the transitional effect.

17. An apparatus comprising:
   a receiver device, the receiver device being operable to receive information as part of an encoded multimedia sequence, wherein the information includes a transitional effect associated with a plurality of frames of the multimedia sequence, a period associated with the transitional effect, a beginning frame and an ending frame of the plurality of frames associated with the transitional effect, with at least some frame data being incomplete therebetween; and
   a hardware decoder device, the decoder device being operable to simulate the transitional effect over the period in response to the information, wherein simulating the transitional effect over the period comprises reconstructing, based on the information, the frames between the beginning frame and the ending frame by performing weighted bi-directional reconstruction of at least some of the frames using at least one of motion vectors of zero values or predefined maps of the transitional effect.

18. The apparatus of claim 17, wherein the decoder device includes a transitional effect decoding module that simulates the transitional effect and a standard decoding module that decodes non-transitional portions of the encoded multimedia sequence.

19. The apparatus of claim 17, wherein the information includes a type of transitional effect, and wherein the decoder simulates the identified type of transitional effect over the period.

20. The apparatus of claim 17, wherein the decoder device generates one or more geometric maps associated with the transitional effect and uses the one or more geometric maps to simulate the transitional effect.

21. The apparatus of claim 20, wherein the decoder device generates the one or more geometric from one or more lookup tables.

22. The apparatus of claim 17, wherein the decoder device simulates the transitional effect by segmenting frames of a transitional sequence into a forward prediction part and a backward prediction part and decoding the forward prediction part differently than the backward prediction part.

23. An apparatus comprising:
   a detector device, the detector device being operable to detect a transitional effect associated with a plurality of frames of a multimedia sequence during the encoding of the multimedia sequence;
   a hardware encoder device, the encoder device being operable to generate information to identify the transitional effect as part of an encoded video sequence, wherein the information includes a period associated with the transitional effect and a beginning frame and an ending frame of the plurality of frames associated with the transitional effect with at least some frame data being incomplete therebetween such that a decoder may reconstruct, based on the information, the frames between the beginning frame and the ending frame by performing weighted bi-directional reconstruction using at least one of motion vectors of zero values or predefined maps of the transitional effect; and
   a transmitter device, the transmitter device being operable to transmit the encoded video sequence that includes the information to a device comprising a decoder.

24. The apparatus of claim 23, wherein the information includes a type of transitional effect.

25. The apparatus of claim 23, wherein the encoder device includes a first encoding module to generate the information to identify the transitional effect and a second encoding module that encodes non-transitional portions of the multimedia sequence using predictive coding techniques.

26. A non-transitory machine-readable medium comprising instructions that upon execution cause a machine to:
   receive information as part of an encoded multimedia sequence, wherein the information includes a transitional effect associated with a plurality of frames of the multimedia sequence, a period associated with the transitional effect, and a beginning frame and an ending frame of the plurality of frames associated with the transitional effect with at least some frame data being incomplete therebetween; and
   decode the encoded multimedia sequence including simulating the transitional effect over the period in response to the information, wherein simulating the transitional effect over the period comprises reconstructing, based on the information, the frames between the beginning frame and the ending frame by performing weighted bi-directional reconstruction of the plurality of frames associated with the transitional effect using at least one of motion vectors of zero values or predefined maps of the transitional effect.

27. The machine-readable medium of claim 26, wherein the information includes a type of transitional effect, and beginning and ending scenes associated with the transitional effect, and wherein simulating the transitional effect includes generating one or more geometry maps.

28. The machine-readable medium of claim 26, wherein the instructions simulate the transitional effect by segmenting frames of a transitional sequence into a forward prediction part and a backward prediction part and decoding the forward prediction part differently than the backward prediction part.

29. A non-transitory machine-readable medium comprising instructions that upon execution cause a machine to:
   detect a transitional effect associated with a plurality of frames of a multimedia sequence during encoding of the multimedia sequence; and
   generate information as part of an encoded multimedia sequence to identify the transitional effect, wherein the information includes a period associated with the transitional effect and a beginning frame and an ending frame of the plurality of frames associated with the transitional effect, with at least some frame data being incomplete therebetween such that a decoder may reconstruct, based on the information, the frames between the beginning frame and the ending frame by performing weighted bi-directional reconstruction using at least one of motion vectors of zero values or predefined maps of the transitional effect; and transmit the encoded multimedia sequence that includes the information to a device comprising a decoder.

30. A processor configured to:
receive information as part of an encoded multimedia sequence, wherein the information includes a transitional effect associated with a plurality of frames of the multimedia sequence, a period associated with the transitional effect, and a beginning frame and an ending frame of the plurality of frames associated with the transitional effect with at least some frame data being incomplete therebetween; and
decode the encoded multimedia sequence including simulating the transitional effect in response to the information, wherein simulating the transitional effect comprises reconstructing, based on the information, the frames between the beginning frame and the ending frame and performing weighted bi-directional reconstruction of the plurality of frames associated with the transitional effect using at least one of motion vectors of zero values or predefined maps of the transitional effect.

31. A processor configured to:
detect a transitional effect associated with a plurality of frames of the multimedia sequence during the encoding of the multimedia sequence; and
generate information as part of an encoded multimedia sequence to identify the transitional effect associated with the plurality of frames to a decoder, wherein the information includes a period associated with the transitional effect and a beginning frame and an ending frame of the plurality of frames associated with the transitional effect with at least some frame data being incomplete therebetween such that a decoder may reconstruct, based on the information, the frames between the beginning frame and the ending frame by performing weighted bi-directional reconstruction using at least one of motion vectors of zero values or predefined maps of the transitional effect; and
transmit the encoded multimedia sequence including the information.

32. The processor of claim 31, wherein the information includes identification of a type of transitional effect, and beginning and ending scenes associated with the transitional effect.

33. The processor of claim 31, wherein the information includes one or more geometric maps that are be used by a decoder to simulate the transitional effect.

34. An apparatus comprising:
means for receiving information as part of an encoded multimedia sequence, wherein the information includes a transitional effect associated with a plurality of frames of the multimedia sequence, a period associated with the transitional effect, and a beginning frame and an ending frame of the plurality of frames associated with the transitional effect with at least some frame data being incomplete therebetween; and means for decoding that simulates the transitional effect in response to the information identifying the transitional effect, wherein simulating the transitional effect comprises reconstructing, based on the information, the frames between the beginning frame and the ending frame and performing weighted bi-directional reconstruction of the plurality of frames associated with the transitional effect using at least one of motion vectors of zero values or predefined maps of the transitional effect.

35. The apparatus of claim 34, wherein the means for decoding comprises means for transitional effect decoding, the apparatus further comprising means for standard decoding that decodes non-transitional portions of the multimedia sequence.

36. The apparatus of claim 34, wherein the information includes a type of transitional effect, and wherein the means for decoding uses the information to simulate the identified type of transitional effect over the period.

37. The apparatus of claim 34, wherein the means for decoding generates one or more geometric maps associated with the transitional effect and uses the one or more geometric maps to simulate the transitional effect.

38. The apparatus of claim 34, wherein the means for decoding simulates the transitional effect by segmenting frames of a transitional sequence into a forward prediction part and a backward prediction part and decoding the forward prediction part differently than the backward prediction part.

39. An apparatus comprising:
means for detecting transitional effects that detects a transitional effect associated with a plurality of frames of a multimedia sequence during the encoding of the multimedia sequence; and
means for encoding that generates information to identify the transitional effect, wherein the information includes a period associated with the transitional effect, and a beginning frame and an ending frame of the plurality of frames associated with the transitional effect with at least some frame data being incomplete therebetween such that a decoder may reconstruct, based on the information, the frames between the beginning frame and the ending frame by performing weighted bi-directional reconstruction using at least one of motion vectors of zero values or predefined maps of the transitional effect; and
means for transmitting the information with the multimedia sequence.

40. The apparatus of claim 39, wherein the information includes a type of transitional effect.

41. The apparatus of claim 39, wherein the means for encoding comprises means for transitional effect encoding, the apparatus further comprising means for standard encoding that encodes non-transitional portions of the multimedia sequence using predictive coding techniques.

* * * * *

UNITED STATES PATENT AND TRADEMARK OFFICE
CERTIFICATE OF CORRECTION

PATENT NO.      : 8,239,766 B2
APPLICATION NO. : 11/501969
DATED           : August 7, 2012
INVENTOR(S)     : Tian et al.

It is certified that error appears in the above-identified patent and that said Letters Patent is hereby corrected as shown below:

Column 15, line 53, claim 21: "one or more geometric from" to read as --one or more geometric maps from--

Signed and Sealed this
Eleventh Day of September, 2012

David J. Kappos
*Director of the United States Patent and Trademark Office*